(No Model.) 2 Sheets—Sheet 1.
J. S. STEVENS, C. G. MAJOR & T. W. BARBER.
HYDRAULIC LIFT.
No. 312,921. Patented Feb. 24, 1885.
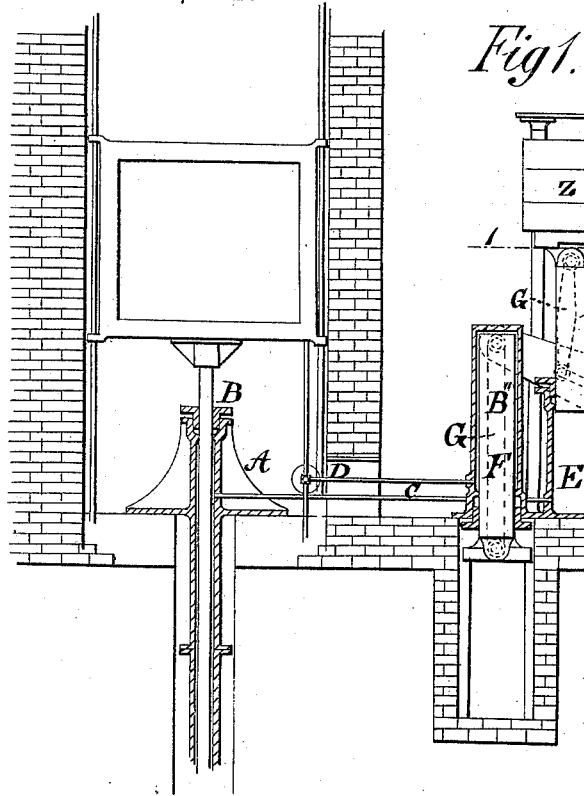
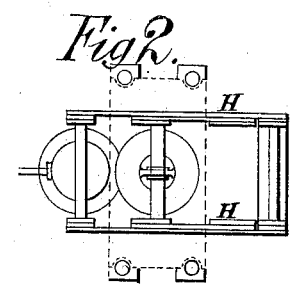
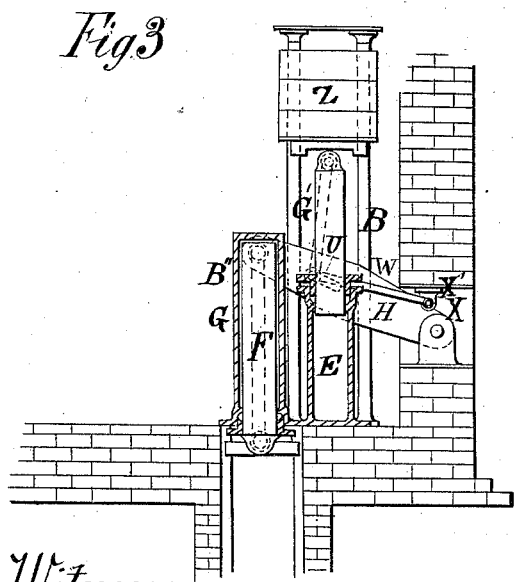
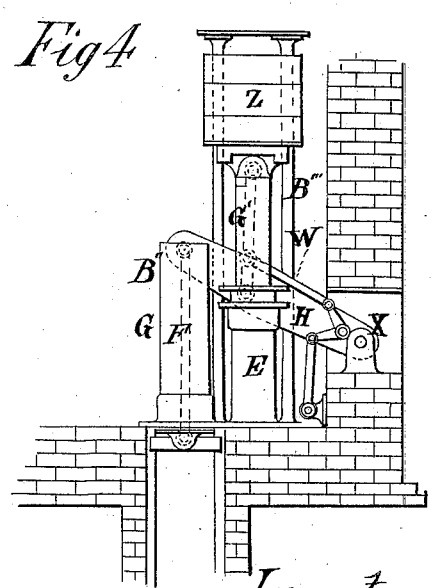
Witnesses
Percy J Hedges
W. F. Fox
Inventors
John Sanders Stevens
Charles George Major
Thomas Walker Barber
per J. M. Rogers
Attorney (No Model.) 2 Sheets—Sheet 2.

J. S. STEVENS, C. G. MAJOR & T. W. BARBER.
HYDRAULIC LIFT.

No. 312,921. Patented Feb. 24, 1885.

Witnesses:
W. R. Haight
R. E. Grant

Inventors:
John Sanders Stevens,
Charles George Major,
Thomas Walter Barber,
by W. H. Babcock
Attorney

UNITED STATES PATENT OFFICE.

JOHN SANDERS STEVENS AND CHARLES GEORGE MAJOR, OF BATTERSEA, COUNTY OF SURREY, AND THOMAS WALTER BARBER, OF ULVERSTONE, COUNTY OF LANCASTER, ENGLAND.

HYDRAULIC LIFT.

SPECIFICATION forming part of Letters Patent No. 312,921, dated February 24, 1885.

Application filed June 5, 1884. (No model.) Patented in England September 14, 1882, No. 4,375; in Germany March 8, 1883, No. 24,983; in Belgium March 12, 1883, No. 60,726; in France March 12, 1883, No. 154,242, and in Austria-Hungary July 29, 1883, No. 29,945.

*To all whom it may concern:*

Be it known that we, JOHN SANDERS STEVENS, of James Works, Queen's Road, Battersea, CHARLES GEORGE MAJOR, of 34 Freke Road, Battersea, in the county of Surrey, and THOMAS WALTER BARBER, of Ulverstone, in the county of Lancaster, England, subjects of the Queen of Great Britain, have invented certain new and useful Improvements in Hydraulic Lifts, (for which we have received Letters Patent in Great Britain, No. 4,375, September 14, 1882; Belgium March 12, 1883, No. 60,726; France March 12, 1883, No. 154,242; Germany March 8, 1883, No. 24,983; Austria-Hungary July 29, 1883, No. 29,945, N;) and we do hereby declare that the following is a full, clear, and exact description of the invention, which will enable others skilled in the art to which it appertains to make and use the same.

Figure 5:
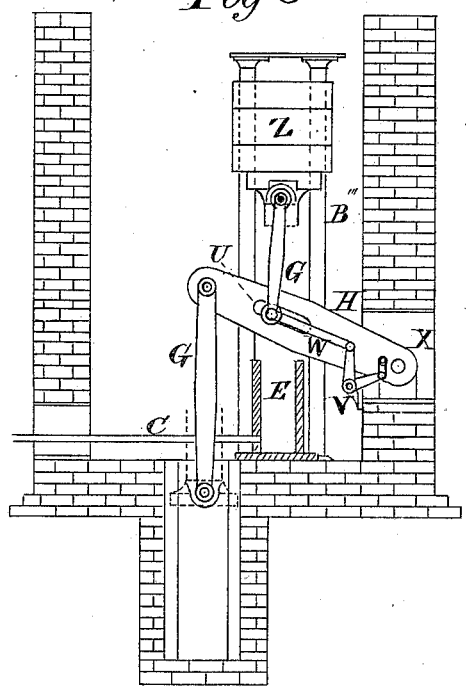
Figure 6:
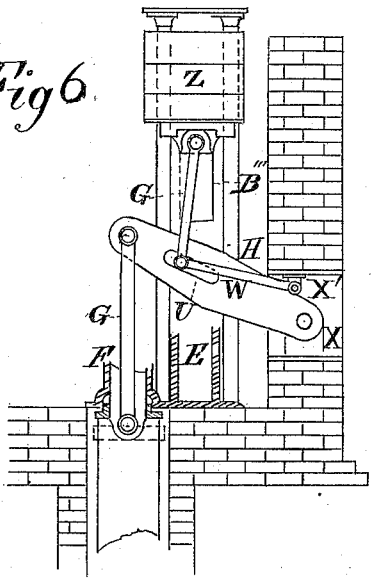
Figure 7:
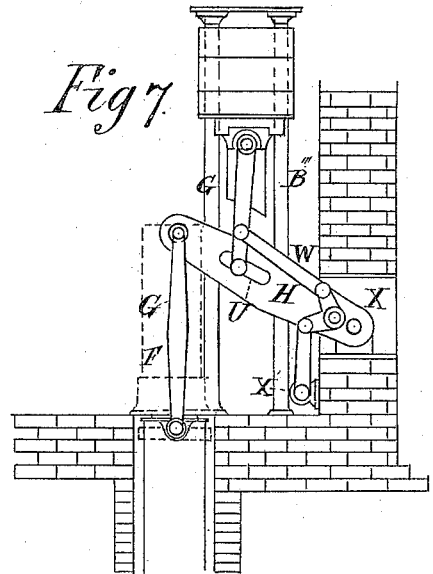

Figure 1 represents a vertical sectional view through the mechanism embodying our invention. Fig. 2 represents a detail plan view of the pivoted beams and proximate devices. Figs. 3 and 4 represent views similar to Fig. 1, (except that the main cylinder and cage is not shown in them,) illustrating modified forms of the connection. Fig. 5 represents a view similar to Fig. 1, omitting the main cylinder and cage, some of the parts being removed to show the slot U more clearly; and Figs. 6 and 7 represent, respectively, views corresponding to Figs. 3 and 4, certain parts being removed for the same purpose as in Fig. 5.

Our invention has for its object, first, the suppression of the chains and weights hitherto used for counterbalancing the dead-weight of ram and cage, when such cage is attached to the top of a ram sliding in a suitable cylinder, such ram being forced out by hydraulic pressure; second, to balance the weight of ram and cage without the use of the usual weights and chains, and to obtain compensation for the varying immersion of the ram.

In designing our improvements we so proportion the ram of the lift as that it shall have the necessary strength to carry the load, entirely regardless of the pressure of the driving-water. The cylinder containing the lift-ram is in free and constant communication with another cylinder, afterward described as the "balancing-cylinder," and a constant volume of water oscillates between the two cylinders. A ram working in the balance-cylinder is loaded to an extent sufficient to nearly balance the lift-ram and cage, leaving a margin of difference to enable the latter to descend. This load is sometimes attached to other portions of the apparatus which move simultaneously with and in the same direction as the balance-ram, and which are mechanically attached to it. Immediately beside the balance-cylinder is placed a third or driving cylinder, fitted with a ram and working vertically, but in an inverted position. The rams of the driving and balance cylinders are connected by means of two connecting-rods with two beams, which are pivoted to a bracket on the wall. The driving-cylinder is in communication with the water main or drain alternately by means of a pipe and three-way valve.

We will now proceed to explain more fully our invention by means of the drawings. A, Fig. 1, is the ram-cylinder; B, the ram carrying the cage, which, together with the ram, is supported and actuated entirely by the water beneath it, without the assistance of overhead balance-weights and chains. A second or balance cylinder, E, is provided, having same capacity as lift-cylinder, but of shorter stroke. It is fitted with a suitable ram, B''', fixed vertically, and is always in free communication with lift-cylinder A by means of pipe C. Immediately beside the balance-cylinder is a third or driving cylinder, F, fitted with a ram, B'', and working vertically, but in an inverted position.

H designates two parallel beams or levers pivoted at their rear ends to lugs of a bracket, X, in a recess of the wall. Each of these levers has linked to it near said bracket one end of a bell-crank lever, V, the other end of which is attached to a link-bar, W, which has its outer end attached to a pivot on a block that slides in a longitudinal slot, U, of said lever. A connecting-rod, G, extends from the upper end of ram B''' to this pivot. Another connecting-rod, G', extends from the free end of said beam H to the lower part of ram B''. As said lever rocks downward, it causes said bell-crank lever V to rock outwardly and draw the pivot-block in slot U toward the pivoted end of said lever, thus continually changing the leverage of said ram B''' as applied through connecting-rod G and lever H in opposition to ram B. The space between the rams of balance-cylinder E and lift-cylinder A is filled with water, which oscillates from one cylinder to the other as the lift is worked. The driving-cylinder E is in communication with the water main or drain alternately by means of the pipe and three-way valve D. When the valve opens communication between pressure-main and driving-cylinder F, the pressure of the water drives down the ram B'', carrying with it, by means of connecting-rod G, the beam H and balance-ram B'''. The latter being forced into its cylinder, drives the water from under it into lift-cylinder A, so lifting the ram B and cage. If the three-way valve D is reversed, the opposite motion takes place. The lift-ram B and cage descend, their weight forcing up the balance and driving rams, and the charge of driving-water flows away to the drains. The driving-ram B'' and the balance-ram B''' always travel together in the same direction, which is always opposite to that of the lift-ram. In some cases the weight of the balance and driving rams will balance that of the main ram and cage. If it is insufficient for this purpose, we load the beam or either of the rams, or both of them, to the requisite extent, as shown at Z, the guide-frame being carried up clear of the rams and beams. The water drawn from the main is only that which is required to raise the actual load and overcome friction. The capacity of the driving-cylinder and the position of its attachment to the beam will depend upon the pressure of the driving-water. If the attachment is farther from the fulcrum, it will exert a greater thrust upon the balance-ram than if it were nearer. As the lift-ram is forced out of its cylinder, a continually-decreasing portion of its length is immersed, and the water behind it loses effect to the extent of the pressure of a column of water equal to the rise of the ram. As the ram descends, it meets a continually-increasing resistance from the same cause. The variation may be compensated by increasing the effective driving-pressure as the lift rises and decreasing the resistance as it descends. We obtain these results by making the connection of either of the rams to the beam by means of a slide, and by introducing a bell-crank and link motion we cause the connection to vary in position in accordance with the position of the lift, thus altering the leverage upon the beam. Reference to Figs. 1, 3, and 4 will make this clear. It will be seen, Fig. 1, that connecting-rod G is fastened to link W, sliding upon a block in slot U. The link W is connected to crank V, and as the ram B''' sinks in cylinder E the link-block will by means of the crank V be drawn nearer the fulcrum or pivot X, thus giving the driving-ram B'' and beam H a greater leverage upon the ram B''' in balance-cylinder as the main ram is forced upward, so compensating for the varying immersion of the ram. The fulcrum of the beam can be made to slide, if desired, with practically the same result. Figs. 3 and 4 show another method of obtaining the same result. The radius-link W has a length equal to the mean distance of slide-block from fulcrum X. It is pivoted at X', the position of which is so arranged that the opposite end of link will describe a path which connects the two extreme positions of such slide-block, these positions being at the outward extremity of the slot in the beam when the latter is at its upper position, and at the inner extremity of slot when the beam is in its lower position, and so bell-cranks and links are avoided.

Fig. 4 shows another method of arranging the cranks and links. The link W is fastened to the wall-plate X, and as ram B''' descends into cylinder E the connecting-rod G is forced toward the fulcrum end of beam, the bell-crank being pivoted to beam.

We claim—

1. The main cylinder and main ram of a hydraulic lift, in combination with a balance-ram and balance-cylinder, a tube connecting said cylinders below said rams, a driving-ram and driving-cylinder having connection with the water supply and drain, a beam or lever connected by rods to said balance-ram and driving-ram, and a sliding block which makes the attachment between said lever and the connecting-rod of said balance-cylinder, whereby the leverage exerted on and by said balance-ram is increased or decreased to compensate for the varying relative resistance of the main ram and the water in the main cylinder, substantially as set forth.

2. The combination, in a hydraulic lift, of a balance and driving cylinder, such cylinders being coupled by connecting-rods and beams, the latter being provided with a slot in which the block connected to the connecting-rod travels, substantially as described.

3. The combination of a main ram-cylinder and pipes leading therefrom with the reversely-arranged cylinders E F, the reversely-operating rams B'' B''', the connecting-rods G G', attached to these latter rams, respectively, the lever H, pivoted to a fixed point at one end, having pivoted connection at the other end to connecting-rod G', and provided at an intermediate point with a longitudinal slot, U, in which slides a pivot-block, to which the lower end of connecting-rod G is attached, and a bell-crank lever, V, pivoted to a fixed point, and linked at one end to said sliding pivot-block, and at the other to said lever or beam, so that the rocking of the latter will cause said bell-crank lever to shift the said pivot-block toward the pivoted end of said lever, thereby automatically changing the leverage, as stated.

In testimony whereof we affix our signatures in presence of two witnesses.

JOHN SANDERS STEVENS.
CHARLES GEORGE MAJOR.
THOMAS WALTER BARBER.

Witnesses to the signature of John Sanders Stevens:
 A. STEAD,
 F. A. PESKETT,
*Clerks to Messrs. Grain & Sons, 7 Pope's Head Alley, London.*

Witnesses to the signature of Charles George Major:
 E. T. RICKETTS,
 W. BIBBS,
*Clerks to Messrs. Grain & Sons, Notaries, 7 Pope's Head Alley, London.*

Witnesses to the signature of Thomas Walter Barber:
 ELIJAH THOMAS SALTHOUSE,
 JOHN THOMAS PARK,
*Both of 14 Union Street, Ulverstone, Solicitor's Clerks.*